United States Patent
Kleinschmidt et al.

[15] 3,643,468
[45] Feb. 22, 1972

[54] CONSTANT VELOCITY SLIDING JOINT COUPLING

[72] Inventors: Hans-Joachim Kleinschmidt, Essen; Karl-Heinz Teinert, Essen-Steele, both of Germany

[73] Assignee: Gelenkwellenbau GmbH, Essen, Germany

[22] Filed: Dec. 22, 1969

[21] Appl. No.: 887,158

[30] Foreign Application Priority Data

Dec. 27, 1968    Germany..................P 18 17 195.4

[52] U.S. Cl..................................................64/8
[51] Int. Cl..................................................F16d 3/02
[58] Field of Search.................................64/7, 8, 12

[56] References Cited

UNITED STATES PATENTS 3,318,108   5/1967   Cadiou........................................64/8
3,446,035   5/1969   Enke............................................64/8

*Primary Examiner*—Edward G. Favors
*Attorney*—Curt M. Avery, Arthur E. Wilfond, Herbert L. Lerner and Daniel J. Tick

[57] ABSTRACT

Constant velocity sliding joint coupling includes one joint half having a plurality of axially extending arms disposed at equally spaced intervals about the periphery thereof, the arms having free ends and axially extending lateral faces, respective lateral faces of adjacent arms being disposed opposite one another and defining therebetween an imaginary cylinder having an axis extending parallel to the axis of the one joint half. The other joint half is in the form of a star and includes a hub, a plurality of stubs or arbors extending radially from the hub, and a respective joint member comprising a central spherical segment having a radius substantially equal to the radius of the imaginary cylinder which is rotatably and longitudinally displaceably mounted on the stubs. The free ends of the axially extending arms are enclosed by a ring member.

6 Claims, 5 Drawing Figures

CONSTANT VELOCITY SLIDING JOINT COUPLING

Our invention relates to constant velocity sliding joint couplings wherein the halves of the joint couplings are longitudinally displaceable relative to one another.

Such joint couplings are particularly employed for the drive mechanism for stands of rolls, half of the joint having a plurality of axially extending arms disposed at equally spaced intervals about the periphery thereof, the arms having axially extending lateral faces, respective lateral faces of adjacent arms being disposed opposite one another and defining therebetween an imaginary cylinder having an axis extending parallel to the axis of the joint half. Such joint couplings also have another joint half which is in the form of a star and includes a hub, a plurality of arbors or studs extending radially from the hub, and a respective joint member in the form of a central spherical segment having a radius substantially equal to the radius of the imaginary cylinder which is rotatably and longitudinally displaceably mounted on the studs.

In the heretofore known couplings of this general type, the arms are not supported at their free ends. They are therefore spread apart during operation by the peripheral forces transmitted by the joint members. The consequent deformations of the arms limit the transmissible torque.

Constant velocity sliding joint couplings of a similar type have already become known wherein slideways provided specifically for accommodating the joint members are machined in the form of cylindrical peripheral surfaces from a closed body (German Utility Model Specification No. 1,888,833, French Pat. No. 1,268,690). These couplings heretofore known in the art must necessarily have a greater diameter than the coupling initially mentioned hereinbefore. Moreover, manufacture of the joint half provided with the cylindrical peripheral surfaces is very costly.

It is accordingly an object of our invention to provide a constant velocity sliding joint coupling of the initially mentioned type which, having the same dimensions as the known couplings of this type, can transmit a considerably higher torque.

With the foregoing and other objects in view we provide in accordance with our invention constant velocity sliding joint coupling comprising one joint half having a plurality of axially extending arms disposed at equally spaced intervals about the periphery thereof, the arms having free ends and axially extending lateral faces, respective lateral faces of adjacent arms being disposed opposite one another and defining therebetween an imaginary cylinder having an axis extending parallel to the axis of the one joint half; the other joint half being in the form of a star and including a hub, a plurality of stubs or arbors extending radially from the hub, and a respective joint member comprising a central segment of a sphere having a radius substantially equal to the radius of the imaginary cylinder being rotatably and longitudinally displaceably mounted on the arbors; and a ring member enclosing the free ends of the axially extending arms.

By providing the ring member, deformation of the arms due to the action of peripheral forces applied thereto in tangential direction is prevented. Consequently, the transmissible torque is no longer limited by deformation of the arms. Testing has shown that for the same peripheral forces, deformations of the arms in the coupling of our invention are now only about one-fourth of the deformations for couplings heretofore known in the art having unsupported or cantilevered arms. Consequently, a substantially higher torque is obviously transmissible by the coupling of the invention in the instant application. In accordance with a further feature of our invention and in order to provide an expedient bayonet-joint connection between the ring and the arms, the ring is provided, at an end thereof directed toward the joint members, with radially inwardly extending projections having a width corresponding substantially to the dimension of the arms measured in the peripheral direction, and being received in matching peripheral grooves formed in the arms.

In accordance with another feature of our invention which is included in another embodiment thereof, the projecting members are formed with inner surfaces widening conically outward in axial direction toward an end of the ring directed away from the joint members, the inner surfaces cooperating with correspondingly conically shaped surfaces formed at the radially outer side of the arms at the ends thereof so as to provide a play-free seating of the ring on the arms.

In accordance with yet another feature of the invention as provided in another embodiment thereof, the arms are formed at the free ends thereof with an external thread, and the ring is formed on the end thereof directed toward the joint members with an internal thread threadedly engageable with the external thread of the arms for connecting the ring to the arms.

In accordance with an additional feature of the invention, the ring is formed with supporting surfaces for a seal cooperating with the hub and for a cover sealingly enclosing the one joint half, whereby the joint is completely protected against external harmful effects.

Other features which are considered as characteristic for the invention are set forth in the appended claims.

Although the invention is illustrated and described herein as embodied in constant velocity sliding joint coupling, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
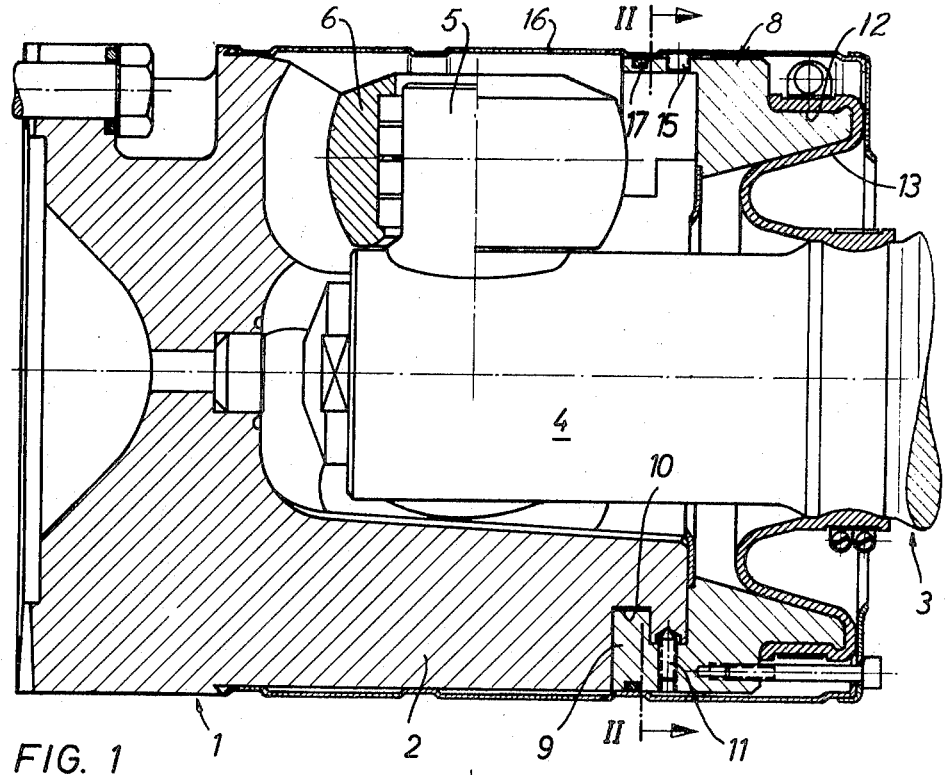
FIG. 1 is a longitudinal sectional view of a joint coupling constructed in accordance with our invention.
Figure 2:
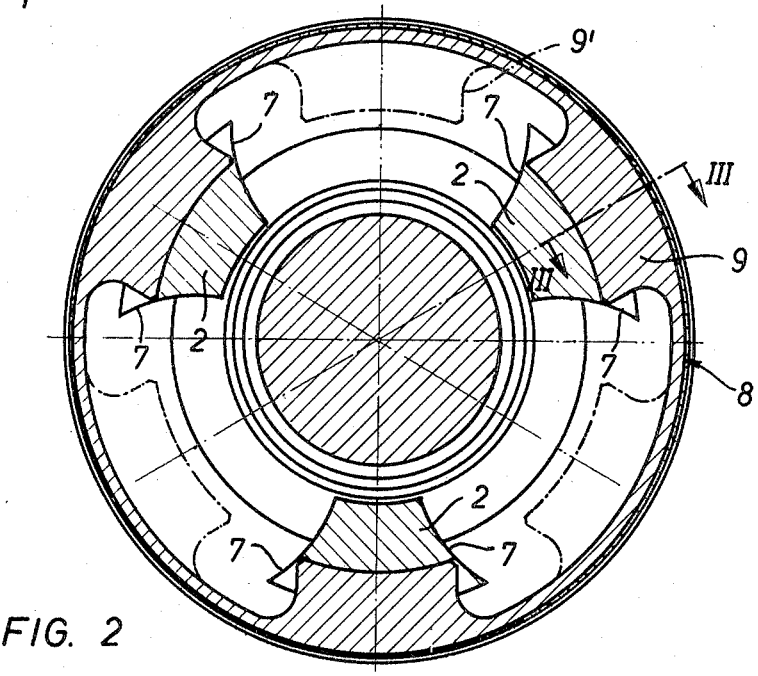
FIG. 2 is a cross sectional view of FIG. 1 taken along the line II—II in the direction of the arrows.

Referring now to the drawings and first particularly to FIGS. 1 and 2 thereof, there is shown a constant velocity sliding joint coupling constructed according to our invention having a joint half 1 provided with three arms 2 spaced at equal intervals of 120° about the periphery of a base portion of the joint half 1, and a second joint half 3 formed of a hub 4 and three radially extending stubs or arbors 5, also peripherally spaced at equal intervals of 120°, on which joint members 6 are rotatably and longitudinally displaceably mounted respectively. The arms 2 are formed with arcuate lateral faces 7 which extend in the axial direction of the arms 2. Respective lateral faces of the arms 2 located adjacent one another in the peripheral direction of the joint half 1 are disposed opposite one another and define therebetween an imaginary cylinder extending parallel to the axis of the joint half 1. Thus, the respective lateral faces 7 of the adjacent arms 2 may be considered as being disposed on a common axially extending surface of a cylinder. The joint members 6 are spherically curved like the cylindrical surface defined by the lateral faces 7 of the adjacent arms 2, the radius of curvature of the surface of the joint members 6 being the same as the radius of curvature of the imaginary cylinder defined by the lateral faces 7 of the adjacent arms 2, each of the joint members 6 being accordingly accommodated between two lateral faces 7 of adjacent arms 2. Because of this arrangement, the two joint halves 1 and 3 are displaceable angularly and longitudinally relative to one another.

The arms 2 are enclosed at the free ends thereof by a ring 8 which, at an end thereof directed toward the joint members 6, is provided with three radially inwardly extending projections 9 spaced at equal intervals of 120° about the periphery of the ring 8. The width of each of the projections 9 corresponds substantially to the dimension of the arms 2 measured in peripheral direction of the joint half 1, and the thickness of the projections 9 corresponds substantially to the width of a peripheral groove 10 formed in the joint half 1 and extending across the arms 2 thereof.

To assemble the ring with the joint halves, the ring 8 is disposed with the projections 9 thereof in the phantom position 9', shown in FIG. 2, between the arms 2 of the joint half 1, and is then pushed forwardly toward the joint half 1 i.e., the left-hand side of FIG. 1, until the projections 9 are in alignment with the annular groove 10. The ring 8 is then rotated relative to the joint half 1 so that the projections 9 are angularly displaced from the phantom position 9' thereof to the solid line position 9 thereof shown in FIG. 2, in which case the projections 9 are each received in respective portions of the annular groove 10 that are formed in the arms 2. After the ring 8 has been rotated into the position thereof shown in solid lines in FIG. 2, it is secured against rotation relative to the arms 2 by tightening a setscrew 11 which binds the ring 8 to the joint half 1. At an end of the ring 8 directed away from the joint members 6, the ring 8 is reduced in diameter in order to provide a support surface 12 for the radially outer end of a flexible roll diaphragm 13, the inner end of the roll diaphragm being fastened to the hub 4. One end of a sleevelike covering 16 is fastened by screws 15 to the outer peripheral surface of the ring 8, which covers the arms 2 and the spaces therebetween, the other end of the sleevelike covering 16, as viewed from the free ends of the arms, is seated on a peripheral surface portion of the joint half 1 located at the base of the arms 2. To provide a seal between the ring 8 and the covering 16, a sealing ring 17 is disposed in a peripheral groove formed at the end of the ring 8 directed toward the joint members 6.

Figure 3:
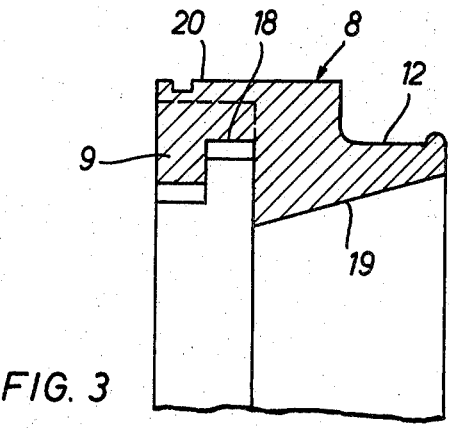
FIG. 3 is a fragmentary sectional view of the ring of FIG. 2 taken along the line III—III in the direction of the arrows.

The construction of the ring 8 can be even more clearly ascertained from FIG. 3. Thus, as seen in FIG. 3, a groove 18 is formed between the projections 9 and the main body portion of the ring 8 and is of such width as to be able to accommodate in a flush-fitting manner the free end of the arms 2 that extend beyond the annular groove 10 in direction away from the joint members 6.

The main body portion of the ring 8 as shown in FIG. 3 is provided with an inner conical surface 19 serving as the surface along which the roll diaphragm 13 can roll when relative axial displacement of the joint half 3 and the joint half 1 occurs. The outer peripheral surface 20 of the ring 8 serves as a supporting surface for the covering 16 shown in FIG. 1.

Figure 4:
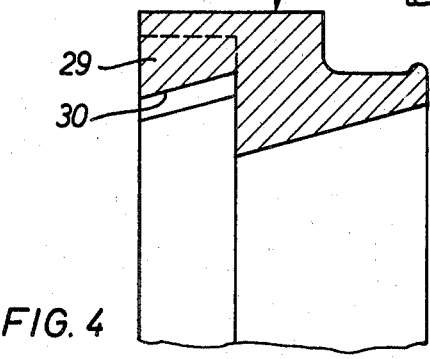

In the modified form of the ring 28 shown in FIG. 4, instead of projections 9 with inner peripheral surfaces defining an imaginary cylinder, as in the embodiment of FIG. 3, projections 29 are provided having inner peripheral surfaces 30 which define an imaginary cone or are disposed on a conical surface. The axis of the conical surface or imaginary cone coincides with the axis of the ring 28. When employing the ring 28 in the joint coupling of our invention, the arms 2 of the joint half 1 must have grooves formed therein tapering inwardly from the free ends thereof at the same angle of conicity as that of the imaginary cone defined by the peripheral surfaces 30. After assembly, which is effected in a manner similar to that for the embodiment of the ring shown in FIG. 3, firm seating of the ring 28 on the joint half 1 is assured.

Figure 5:
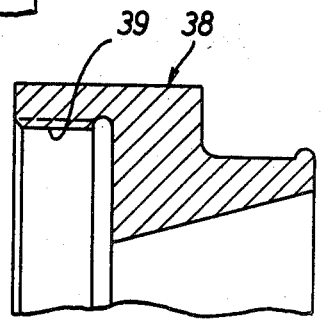
FIGS. 4 and 5 are views similar to that of FIG. 3 of two different embodiments of the ring shown therein.

The further embodiment of the ring 38 shown in FIG. 5 is provided with an internal thread 29 at the end thereof directed toward the joint members 6. When employing the embodiment of the ring 38 shown in FIG. 5 in the joint coupling of our invention, however, an external thread must be formed on the free ends of the arms 2 to permit threading of the ring by its internal thread 29 with the external thread on the arms 2.

We claim:

1. Constant velocity sliding joint coupling comprising a pair of joint halves, one of said joint halves having a base portion and a plurality of arms axially extending from said base portion and disposed at equally spaced intervals about the periphery of said base portion, said arms having free ends and axially extending lateral faces, respective lateral faces of adjacent arms being disposed opposite one another and defining therebetween an imaginary cylinder having an axis extending parallel to the axis of said one joint half, and the other of said joint halves being in the form of a star and including a hub, a plurality of arbors extending radially from said hub, and a respective joint member rotatably and longitudinally displaceably mounted on each of said arbors, said joint member comprising a central segment of a sphere having a radius substantially equal to the radius of said imaginary cylinder; and a ring member axially spaced from said base portion of said one joint half and enclosing said free ends of said axially extending arms.

2. Coupling according to claim 1 wherein said ring member has substantially the same outer diameter as that of said one joint half having said plurality of arms.

3. Coupling according to claim 1 including a seal cooperating with said hub of said other joint half and supported on a supporting surface formed on said ring member, and a covering supported on another supporting surface formed on said ring member and sealingly enclosing said one joint half.

4. Constant velocity sliding joint coupling comprising a pair of joint halves, one of said joint halves having a plurality of axially extending arms disposed at equally spaced intervals about the periphery thereof, said arms having free ends and axially extending lateral faces, respective lateral faces of adjacent arms being disposed opposite one another and defining therebetween an imaginary cylinder having an axis extending parallel to the axis of said one joint half, and the other of said joint halves being in the form of a star and including a hub, a plurality of arbors extending radially from said hub, and a respective joint member rotatably and longitudinally displaceably mounted on each of said arbors, said joint member comprising a central segment of a sphere having a radius substantially equal to the radius of said imaginary cylinder; and a ring member enclosing said free ends of said axially extending arms, said ring member having an end directed toward said joint members, said ring end being formed with radially inwardly extending projections having a width substantially equal to the dimension of said arms measured in the peripheral direction of said one joint half, said projections being received in a matching peripheral groove formed on said one joint half across said arms thereof.

5. Coupling according to claim 4 wherein said projections are formed with radially inner surfaces widening conically outward in axial direction toward an end of said ring member directed away from said joint members, said inner surfaces cooperating with correspondingly conically shaped surfaces formed at the radially outer side of said free ends of said arms.

6. Constant velocity sliding joint coupling comprising a pair of joint halves, one of said joint halves having a plurality of axially extending arms disposed at equally spaced intervals about the periphery thereof, said arms having free ends and axially extending lateral faces, respective lateral faces of adjacent arms being disposed opposite one another and defining therebetween an imaginary cylinder having an axis extending parallel to the axis of said one joint half, and the other of said joint halves being in the form of a star and including a hub, a plurality of arbors extending radially from said hub, and a respective joint member rotatably and longitudinally displaceably mounted on each of said arbors, said joint member comprising a central segment of a sphere having a radius substantially equal to the radius of said imaginary cylinder; and a ring member enclosing said free ends of said axially extending arms, said one joint half being formed at said free ends of said arms with an external thread, and said ring member being formed at the end thereof directed toward said joint members with an internal thread threadedly engageable with said external thread of said arms for connecting said ring member to said one joint half.

* * * * *